(12) United States Patent
Song et al.

(10) Patent No.: US 10,466,704 B2
(45) Date of Patent: Nov. 5, 2019

(54) AUTONOMOUS VEHICLE LOCALIZATION

(71) Applicant: GM GLOBAL TECHNOLOGY OPERATIONS LLC, Detroit, MI (US)

(72) Inventors: Xiaofeng F. Song, Novi, MI (US); Haley M. Dalzell, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 15/630,668

(22) Filed: Jun. 22, 2017

(65) Prior Publication Data

US 2018/0373254 A1 Dec. 27, 2018

(51) Int. Cl.
| | |
|---|---|
| *G05D 1/02* | (2006.01) |
| *G01C 21/36* | (2006.01) |
| *G05D 1/00* | (2006.01) |
| *G01C 21/20* | (2006.01) |

(52) U.S. Cl.
CPC ............ *G05D 1/0212* (2013.01); *G01C 21/20* (2013.01); *G01C 21/36* (2013.01); *G05D 1/0088* (2013.01); *G05D 1/0276* (2013.01)

(58) Field of Classification Search
CPC .. G05D 1/0212; G05D 1/0276; G05D 1/0088; G01C 21/36
See application file for complete search history.

(56) References Cited

U.S. PATENT DOCUMENTS

2018/0099676 A1\* 4/2018 Goto ..................... B60W 30/10
2018/0372501 A1\* 12/2018 Sahlholm ........... G01C 21/3617

\* cited by examiner

*Primary Examiner* — Nga X Nguyen
(74) *Attorney, Agent, or Firm* — Lorenz & Kopf, LLP

(57) ABSTRACT

Methods and apparatus provided for determining a current position of a vehicle are disclosed. The apparatus includes an autonomous driving system for a vehicle with a positioning system configured to determine a current position of the vehicle between an original point of the vehicle and a horizon point ahead the vehicle. The positioning system is configured to receive map data containing at least one road attribute, receive multiple trajectory points which are located between the original point and the horizon point and determine a trajectory which interconnects the multiple trajectory points, determine an absolute position of the vehicle, determine a projection point from the at least one road attribute onto the trajectory, and determine the current position of the vehicle and compare the current position of the vehicle with a position of the projection point of the road attribute between the original point and the horizon point.

15 Claims, 6 Drawing Sheets

AUTONOMOUS VEHICLE LOCALIZATION

TECHNICAL FIELD

The technical field generally relates to autonomous vehicles, and more particularly relates to systems and methods for determining a current position of an autonomous vehicle, especially to localizing an autonomous vehicle in relation to road attributes.

INTRODUCTION

An autonomous vehicle is a vehicle that is capable of sensing its environment and navigating with little or no user input. An autonomous vehicle senses its environment using one or more sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels of automation ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

An autonomous vehicle especially senses road attributes which may be referred to as characteristics of a road or the vehicle's environment. Furthermore, road attributes are also derivable from a map which is accessible by the vehicle. A current position of the vehicle is determined relative to the road attributes. The road attributes and the current position of the vehicle are used to navigate the vehicle.

Accordingly, it is desirable to determine the relative position of the vehicle with respect to the road attributes with a required accuracy. Furthermore, other desirable features and characteristics of the present invention will become apparent from the subsequent detailed description and the appended claims, taken in conjunction with the accompanying drawings and the foregoing technical field and background.

SUMMARY

An autonomous driving system for a vehicle is provided. The autonomous driving system includes a positioning system that is configured to, by a processor, determine a current position of the vehicle between an original point of the vehicle and a horizon point ahead of the vehicle. The positioning system is further configured to, by a processor, receive map data containing at least one road attribute, to receive multiple trajectory points which are located between the original point and the horizon point and determine a trajectory which interconnects the multiple trajectory points, to determine an absolute position of the vehicle, to determine a projection point from the at least one road attribute onto the trajectory, and to determine the current position of the vehicle and compare the current position of the vehicle with a position of the projection point of the road attribute between the original point and the horizon point.

In various embodiments, the positioning system is configured to determine the projection point by determining a perpendicular line onto the trajectory.

In various embodiments, the positioning system is configured to determine a distance value of the vehicle from the original point based on the current position of the vehicle and to compare this distance value with the position of the projection point.

In various embodiments, the positioning system is configured to iteratively track the current position of the vehicle while the vehicle moves.

In various embodiments, the positioning system is configured to determine a covered distance of the vehicle starting from the original point, e.g., with respect to the original point.

In various embodiments, the positioning system is configured to determine a distance between the original point and the road attribute and to compare the covered distance of the vehicle with the distance between the original point and the road attribute.

In various embodiments, the positioning system is configured to use the road attribute for vehicle controls if the covered distance of the vehicle equals the distance between the original point and the road attribute and if, additionally, the current position of the vehicle equals the position of the projection point between the original point and the horizon point.

In various embodiments, the positioning system is configured to generate an error signal to transition the vehicle to a predetermined mode if the covered distance of the vehicle equals the distance between the original point and the road attribute and, additionally, the current position of the vehicle does not equal the position of the projection point between the original point and the horizon point; or the positioning system is configured to generate an error signal to transition the vehicle to a predetermined mode if the covered distance of the vehicle does not equal the distance between the original point and the road attribute and, additionally, the current position of the vehicle equals the position of the projection point between the original point and the horizon point.

A vehicle with a controller is provided, wherein the controller implements an autonomous driving system for the vehicle. The autonomous driving system includes a positioning system that is configured to, by a processor, determine a current position of the vehicle between an original point of the vehicle and a horizon point ahead the vehicle, wherein the positioning system is further configured to, by a processor, receive map data containing at least one road attribute, to receive multiple trajectory points which are located between the original point and the horizon point and to determine a trajectory which interconnects the multiple trajectory points, to determine an absolute position of the vehicle, to determine a projection point from the at least one road attribute onto the trajectory, and to determine the current position of the vehicle and to compare the current position of the vehicle with a position of the projection point of the road attribute between the original point and the horizon point.

It is noted that the various embodiments of the autonomous driving system described herein may be used in combination with the vehicle described herein. Therefore, the details provided with respect to the autonomous driving system and the positioning systems are not repeated here for the sake of brevity, while it is understood that the respective features may be combined with the vehicle.

A method for controlling a vehicle is provided. The method includes the steps: receiving map data including at least one road attribute; receiving multiple trajectory points which are located between an original point and a horizon point and determining a trajectory which interconnects the multiple trajectory points; determining, by a processor, a projection point from the at least one road attribute onto the trajectory; determining a current position of the vehicle, and comparing, by a processor, the current position of the vehicle with a position of the projection point of the road attribute between the original point and the horizon point; and controlling the vehicle based on the current position.

In various embodiments, the projection point is determined by determining a perpendicular line onto the trajectory.

In various embodiments, the method further includes the steps: determining a covered distance of the vehicle from the original point, and determining a distance between the original point and the road attribute and comparing the covered distance of the vehicle with the distance between the original point and the road attribute.

In various embodiments, the method further includes the steps: using the road attribute for vehicle controls if the covered distance of the vehicle equals the distance between the original point and the road attribute and, additionally, the current position of the vehicle equals the position of the projection point between the original point and the horizon point; or generating an error signal to transition the vehicle to a predetermined mode if the covered distance of the vehicle equals the distance between the original point and the road attribute and, additionally, the current position of the vehicle does not equal the position of the projection point between the original point and the horizon point; or generating an error signal to transition the vehicle to a predetermined mode if the covered distance of the vehicle does not equal the distance between the original point and the road attribute and, additionally, the current position of the vehicle equals the position of the projection point between the original point and the horizon point.

It is noted that in various embodiments, the method contains steps which correspond to the functions of one or more of the various embodiments of the autonomous driving system described above.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
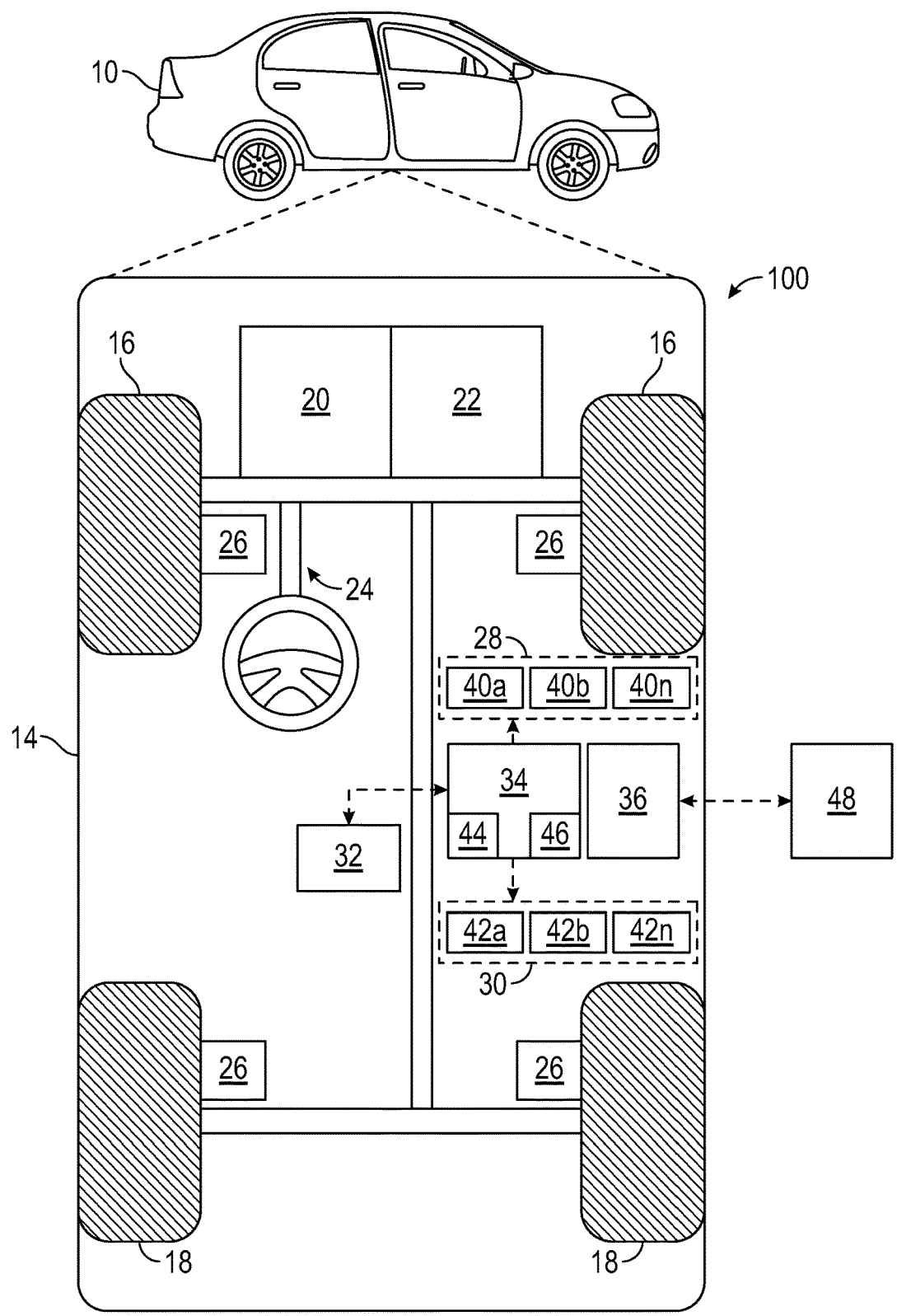
FIG. 1 is a functional block diagram illustrating an autonomous vehicle having an autonomous driving system, in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle. The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 an 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

In various embodiments, the data storage device 32 includes a map module which provides map data to the controller 34 and the autonomous driving system 70. In various embodiments, the map module accesses locally stored map data and/or map data received from a remote map data provider. For example, the map data provider provides map data via the communication system 36.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
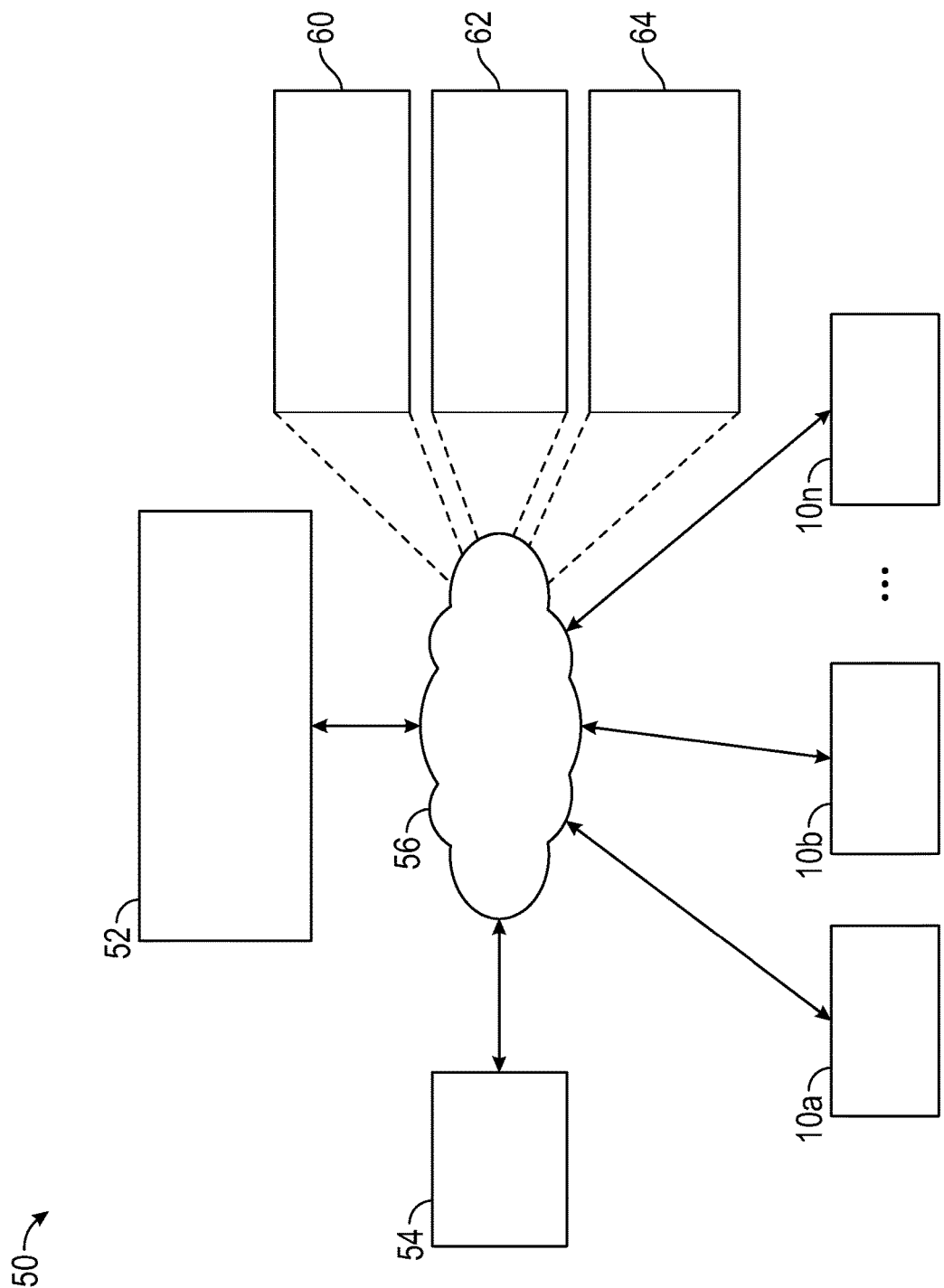
FIG. 2 is a functional block diagram illustrating a transportation system having one or more autonomous vehicles of FIG. 1, in accordance with an embodiment.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 34, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, the controller 34 is configured to implement the autonomous driving system 70 and the positioning system 76 described herein. In particular, the controller 34 is configured to determine a current position of the vehicle 10 between an original point 88 of the vehicle 10 and a horizon point 86 ahead the vehicle, wherein the controller 34 is configured to receive map data containing at least one road attribute 90, receive multiple trajectory points 92 which are located between the original point and the horizon point and determine a trajectory 94 which interconnects the multiple trajectory points, determine an absolute position of the vehicle, determine a projection point 84 from the at least one road attribute 90 onto the trajectory 94, and determine the current position of the vehicle and compare the current position of the vehicle with a position of the projection point 84 of the road attribute 90 between the original point and the horizon point.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent sub scriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
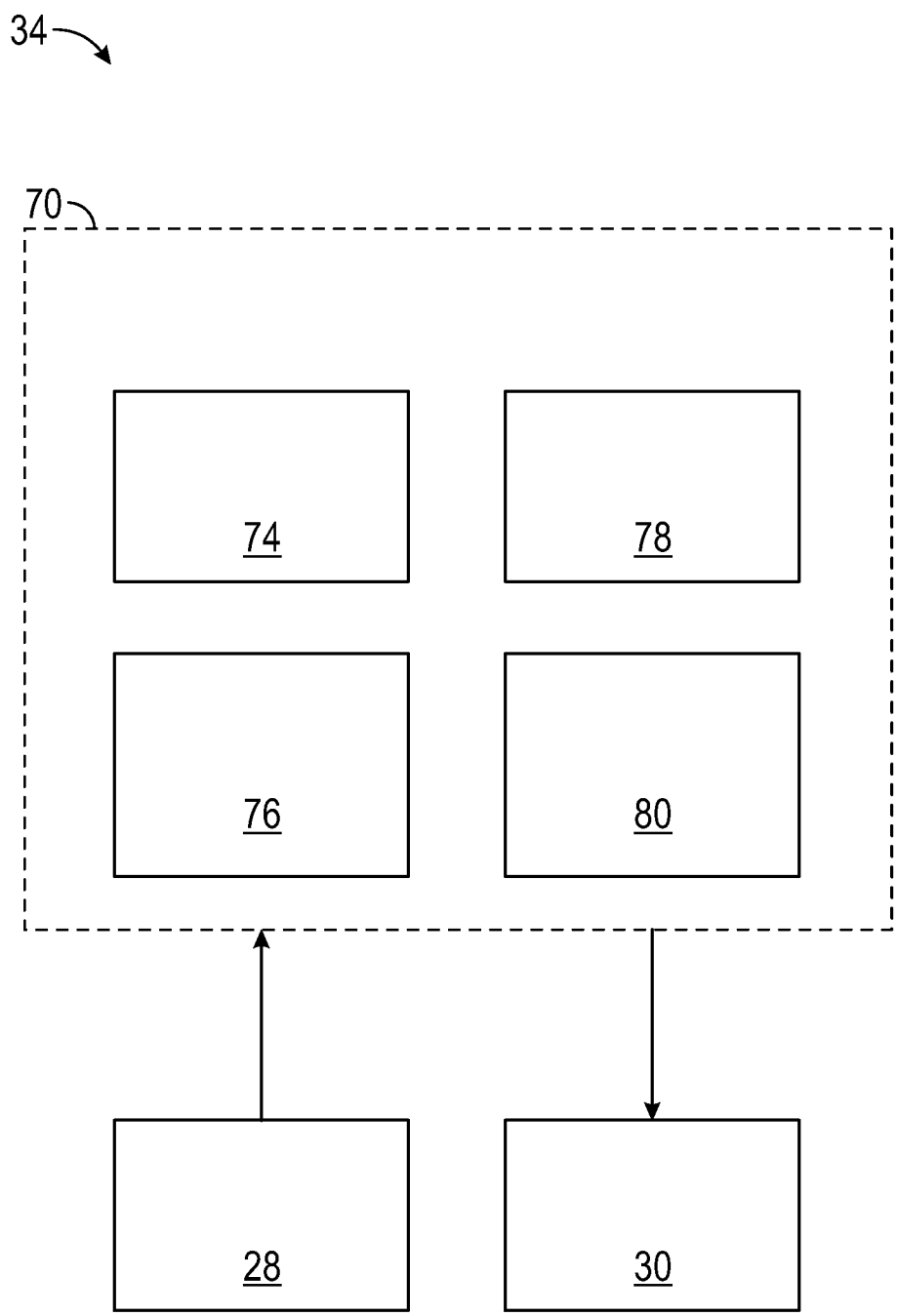
FIG. 3 is a functional block diagram illustrating an autonomous driving system, in accordance with an embodiment.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10. In various embodiments, the controller 34 shown in FIG. 3 is implemented in accordance with what is described herein with reference to the controller 34.

In various embodiments, the autonomous driving system 70 described herein utilizes an Advanced Driver Assistance System (ADAS) and an ADAS Interface Specification (ADASIS) to generate eHorizon. Map road attributes and vehicle position are based on distance along the moving path of the vehicle. Instead of and/or additionally to using only a relative distance of the vehicle with reference to reference points, the autonomous driving system 70 described herein is based on absolute coordinates of the vehicle, as described in more detail above and hereinafter.

In various embodiments, ADAS used multiple data sources, e.g., Lidar, Radar, Imaging, Global Positioning System (GPS), Map data, inter-vehicle-data-exchange, etc. These data sources at least partially correspond to the sensing devices 28 described herein. ADASIS standardizes map localization data model and defines common interface to predict road geometry and road attributes ahead of a vehicle based on the vehicle's position and digital map as one enabler to ADAS and automated driving applications.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 may also be referred to as a sensor fusion system, as it fuses input from several sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

The vehicle control system 80 is configured to communicate a vehicle control output to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

In various embodiments, the autonomous driving system 70 includes a positioning system 76 which is configured to, by a processor, determine a current position of the vehicle 10 between an original point of the vehicle and a horizon point ahead the vehicle. The positioning system 76 is configured to, by a processor, receive map data containing at least one road attribute. In various embodiments, the map data are received via the communication system and/or are stored in the data storage device 32. The positioning system is configured to, by a processor, receive multiple trajectory points which are located between the original point and the horizon point and to determine a trajectory which interconnects the multiple trajectory points. In other words, the trajectory corresponds to a connection line interconnecting the trajectory points and describing one possible moving path following the trajectory points. In various embodiments, the trajectory is determined by interpolating the individual trajectory points along a curvature of the road. The positioning system is configured to, by a processor, determine an absolute position of the vehicle and to determine a projection point from the at least one road attribute and from the absolute current position of the vehicle onto the trajectory. The positioning system is further configured to determine the current position of the vehicle and its projection onto the trajectory and to compare the current position of the vehicle, i.e., the projection of the current position onto the trajectory, with a position of the projection point of the road attribute between the original point and the horizon point. In particular, the positioning system compares the current position of the vehicle, in particular, of a position of the projection of the vehicle's position onto the trajectory, with a distance of the projection point from the original point following the road and its curvature.

In various embodiments, the positioning system 76 is configured to determine the projection point by determining a perpendicular line onto the trajectory. In other words, the road attribute is perpendicularly projected onto the trajectory such that the road attribute and its projection point are located at the same distance from the original point.

In various embodiments, the positioning system 76 is configured to determine a distance value of the vehicle from the original point based on the current position of the vehicle and to compare this distance value with the position of the projection point. Thus, the distance of the vehicle from the projection point is determined and is used to navigate the vehicle. In case the distance value of the vehicle from the original point equals the distance between the original point and the projection point of the road attribute, it is determined that the vehicle is currently located near the respective road attribute and this information is used to navigate the vehicle.

In various embodiments, the positioning system 76 is configured to iteratively track the current position of the vehicle while the vehicle moves. Thus, in various embodiments, the distance of the vehicle from a projection point and the respective road attribute is also iteratively or repeatedly determined.

In various embodiments, the positioning system 76 is configured to determine a covered distance of the vehicle from the original point. The covered distance enables determining the position of the vehicle with respect to the original point. In various embodiments, the covered distance is used in a redundant functional module to determine the position of the vehicle. In this embodiment, the positioning system is optionally configured to determine a distance between the original point and the road attribute and to compare the covered distance of the vehicle with the distance between the original point and the road attribute. Alternatively, the positioning system 76 is configured to use the road attribute for vehicle controls if the covered distance of the vehicle equals the distance between the original point and the road attribute and, additionally, the current position of the vehicle equals the position of the projection point between the original point and the horizon point. Alternatively, the positioning system 76 is configured to generate an error signal to transition the vehicle to a predetermined mode if the covered distance of the vehicle equals the distance between the original point and the road attribute and, additionally, the current position of the vehicle does not equal the position of the projection point between the original point and the horizon point; or generate an error signal to transition the vehicle to a predetermined mode if the covered distance of the vehicle does not equal the distance between the original point and the road attribute and, additionally, the current position of the vehicle equals the position of the projection point between the original point and the horizon point.

Figure 4:
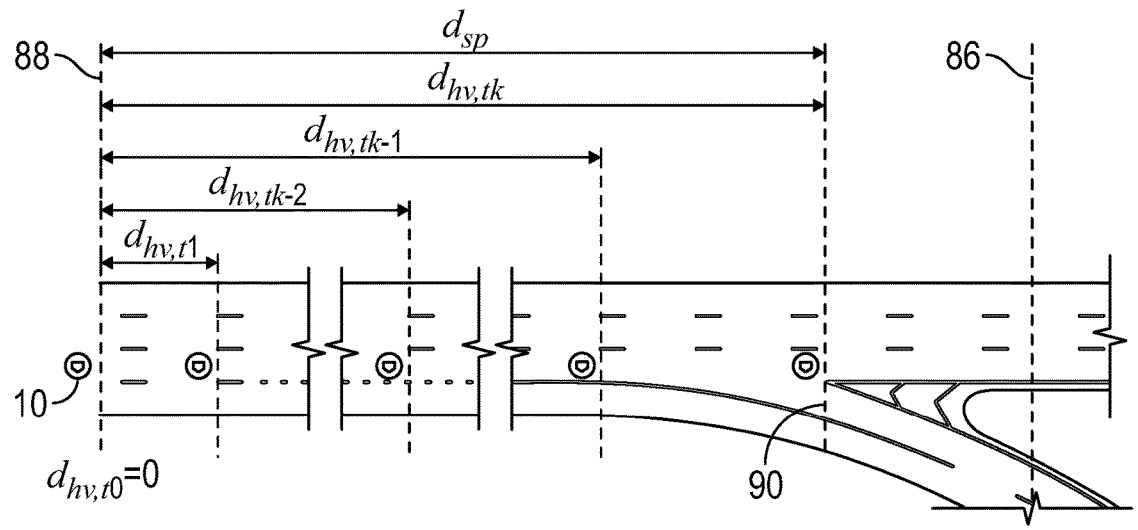
FIG. 4 schematically shows determining a position of a vehicle with respect to a road attribute.

FIG. 4 schematically shows how the position of a vehicle 10 along a road is determined between the original point 88 and a horizon point 86. The vehicle 10 utilizes an electronic horizon, i.e., map data of the road section(s) ahead the vehicle 10 together with road attributes assigned to the road. In various embodiments, horizon point 86 corresponds to the maximum range or distance of the electronic horizon. As the vehicle moves forward, additional map data are provided in order to move on the electronic horizon. Especially the position of road attributes is relevant for autonomous driving. Therefore, the position of the vehicle with respect to the road attributes is relevant.

In various embodiments, the position of the vehicle is determined by tracking the vehicle's covered distance $d_{hv,tk}$ from the original point 88. The covered distance is put in relation to the distance $d_{sp}$ between the original point 88 and the road attribute 90, in this example a split point. If $d_{hv,tk} - d_{sp} = 0$, the vehicle 10 is currently at road attribute 90.

In various embodiments of the autonomous driving system 70 described herein, the current position of the vehicle is projected onto the trajectory 94, so that the projection of the vehicle's position is compared to the projection of the road attribute onto the trajectory. Thus, lateral offset of the vehicle's moving path and/or of the road attribute (vehicle moves along second lane from the right while the trajectory is located between the third and fourth lane, see FIG. 5) with reference to the trajectory 94.

Figure 5:
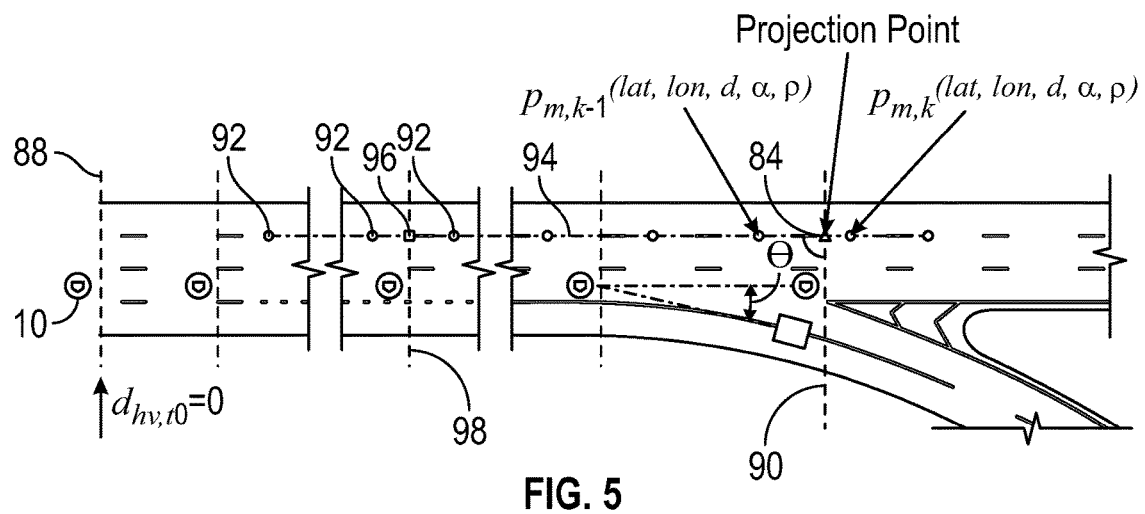
FIG. 5 schematically shows determining a position of a vehicle with respect to a road attribute, in accordance with an embodiment.

FIG. 5 schematically illustrates how the controller 34 described herein and in accordance with various embodiments determines the position of vehicle 10 by using trajectory points 92 within the electronic horizon between original point 88 and horizon point 86. Map data stored within data storage device 32 and/or received via communication system 36 includes multiple trajectory points $p_{m,k}$ (lat, lon, d α, ρ) 92 which describe a moving path 94 (dashed line) interconnecting the individual trajectory points. In various embodiments, each trajectory point 92 stored in the data storage device 32 contains information including latitude coordinate (lat), longitude coordinate (lon), offset or distance to original point 88 (d), heading angle (α), and curvature (ρ, inverse of radius.

A projection point $d_{sp}$, $(p_{m,k-1}, p_{m,k})$ 84 between trajectory points k and k−1 is dynamically generated and its absolute coordinates, e.g., GPS coordinates, are determined in accordance with the following formula:

$$p_{sp,proj}(lat, lon) = p_{m,k-1}(lat, lon) + \frac{d_{sp} - d_{p_{m,k-1}}}{d_{p_{m,k}} - d_{p_{m,k-1}}} * p_{m,k-1}(lat, lon)$$

As vehicle 10 moves forward towards the respective road attribute 90, the current absolute location of the vehicle is tracked and compared with the location of the projection point as follows:

$$d(p_{hv,tk}, p_{m,k-1}) = |p_{hv,tk} - p_{m,k-1}| * \cos\theta;$$

$$\theta = \alpha_{p_{hv,tk}} - \alpha_{p_{m,k-1}}$$

$$p_{hv,tk,proj}(lat, lon) = p_{m,k-1}(lat, lon) + \frac{d_{hv,tk} - d_{p_{m,k-1}}}{d_{p_{m,k}} - d_{p_{m,k-1}}} * p_{m,k-1}(lat, lon)$$

Angle θ is the angle between the vehicle motion heading angle and the map trajectory point heading angle. Angle θ is used to project the distance the vehicle has moved during a predetermined time with respect to the trajectory line and to obtain the net incremental distance, i.e., the net distance the vehicle covered along the trajectory line 94. If vehicle 10 is moving along the map trajectory line 94, θ is around 0°, if vehicle 10 is changing lane or taking exits, θ is unequal to 0° at least for a specific distance.

Based on these considerations, the vehicle is currently at the split point if the distance between the projection of the vehicle's current position onto the trajectory and the projection of the road attribute onto the trajectory is 0. Thus, the approach and the implementation of the autonomous driving system 70 described herein provides robust absolute coordinates based localization independent of vehicle travel distance from original point. In FIG. 5, the projection 96 of the current position of the vehicle 10 onto the trajectory is indicated by vertical projection lines 98.

Figure 6:
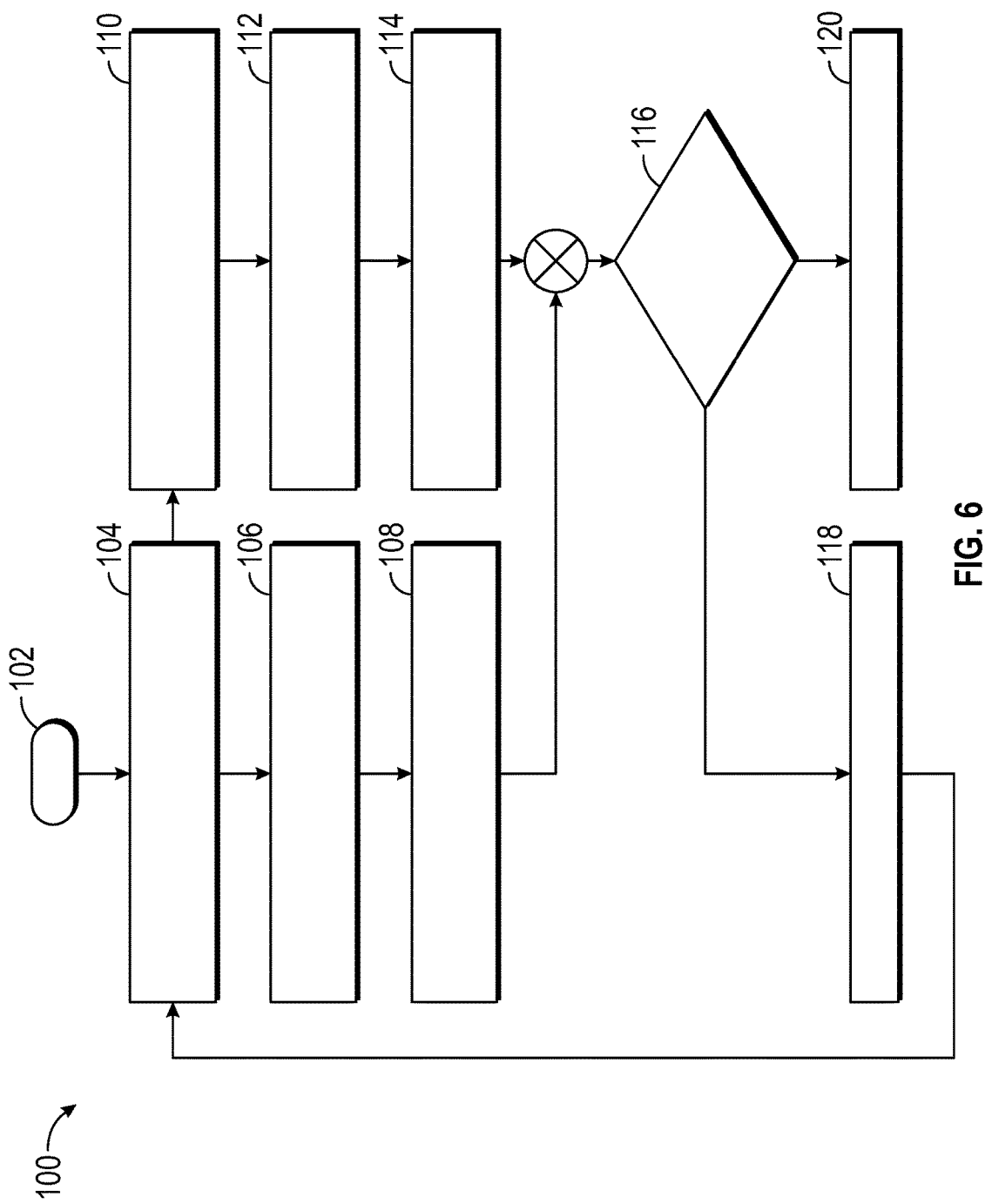
FIG. 6 diagrammatically shows a flow chart for determining a position of a vehicle, in accordance with an embodiment.

FIG. 6 schematically shows an implementation example of the autonomous driving system 70 described herein. Left column shows the functional modules used for localization based on the original point 88 and the distance $d_{hv,tk}$ covered by the vehicle 10 with respect to the original point 88. Right column shows the functional modules used for localization based on the absolute current position of the vehicle 10 and the trajectory points 92, wherein the current position of the vehicle 10 as well as the position of the road attribute 90 are projected onto the trajectory 94 in order to determine the distance between vehicle 10 and road attribute 90.

Start state 102 initiates vehicle localization. In state 104, a map module that is part of the data storage device 32 provides information about a road attribute, e.g., a split point, in particular information relating to the distance $d_{sp}$ of the road attribute. In state 106, the controller 34 stores $d_{sp}$ in buffer and tracks vehicle location $d_{hv,tk}$. If $d_{hv,tk}=d_{sp}$, it is assumed that the vehicle is currently at the respective road attribute.

States 104, 106, 108 describe one vehicle localization scheme, while a redundant localization scheme is provided by states 110, 112, 114. In state 110, distance $d_{sp}$ is used to generate a projection point $p_{sp,proj}(lat,lon)$ of the respective road attribute onto the trajectory 94. Subsequently, in state 112, a projection point $p_{hv,tk,proj}(lat,lon)$ of the vehicle current location onto the trajectory 94 is generated. The distance between the road attribute's projection point and the vehicle's projection point is determined and if this distance is 0, the vehicle is at the road attribute.

Thus, the vehicle's location is determined in accordance with two different schemes and the result of these localization schemes or methods is compared in state 116. If the location values match, the road attribute is used for vehicle controls (state 118), otherwise, the vehicle is transitioned to a system safe mode (state 120).

Figure 7:
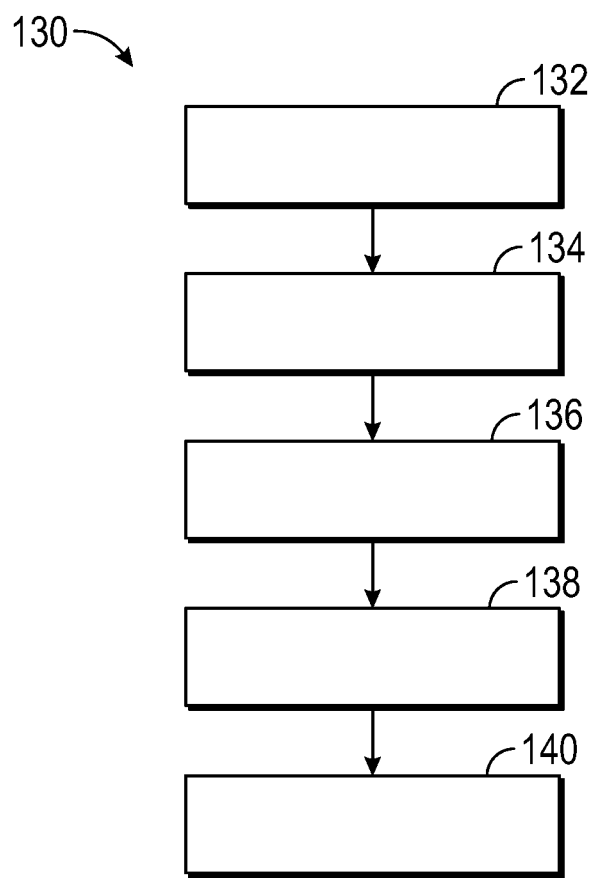
FIG. 7 is a schematic representation of a method, in accordance with an embodiment.

FIG. 7 is a schematic representation of a method 130 for determining a current position of a vehicle. In various embodiments, this method is implemented by an autonomous driving system 70 described herein. The method includes the steps: receiving 132 map data containing at least one road attribute 90; receiving 134 multiple trajectory points 92 which are located between the original point 88 and the horizon point 86 and determining a trajectory 94 which interconnects the multiple trajectory points 92; determining 136 an absolute position of the vehicle 10; determining a projection point 84 from the at least one road attribute 90 onto the trajectory 94; determining the current position of the vehicle 10 and comparing the current position of the vehicle with a position of the projection point of the road attribute between the original point and the horizon point.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An autonomous driving system for a vehicle, the autonomous driving system comprising:
   a controller comprising:
   a processor; and
   a positioning system, configured to, by the processor, determine a current position of the vehicle between a first point along a road and a second point along the road and associated with a horizon ahead of the vehicle;
   wherein the positioning system is further configured to, by the processor:
   receive map data containing at least one road attribute;
   receive multiple trajectory points which are located between the first point and the second point and determine a trajectory which interconnects the multiple trajectory points;
   determine an absolute position of the vehicle;
   determine a projection point from the at least one road attribute onto the trajectory;
   determine the current position of the vehicle and compare the current position of the vehicle with a position of the projection point of the road attribute between the first point and the second point,
   wherein the positioning system is configured to determine a covered distance of the vehicle from the first point,
   wherein the positioning system is configured to
   generate an error signal to transition the vehicle to a predetermined mode if the covered distance of the vehicle equals the distance between the first point and the road attribute and, additionally, the current position of the vehicle does not equal the position of the projection point between the first point and the second point; or
   generate an error signal to transition the vehicle to a predetermined mode if the covered distance of the vehicle does not equal the distance between the first point and the road attribute and, additionally, the current position of the vehicle equals the position of the projection point between the first point and the second point.

2. The autonomous driving system of claim 1,
   wherein the positioning system is configured to determine the projection point by determining a perpendicular line onto the trajectory.

3. The autonomous driving system of claim 1,
   wherein the positioning system is configured to determine a distance value based on the first point and the current position of the vehicle and to compare this distance value with the position of the projection point.

4. The autonomous driving system of claim 1,
   wherein the positioning system is configured to iteratively track the current position of the vehicle while the vehicle moves.

5. The autonomous driving system of claim 1,
   wherein the positioning system is configured to determine a distance between the first point and a point associated with the road attribute and to compare the covered distance of the vehicle with the distance between the first point and the road attribute.

6. The autonomous driving system of claim 1,
   wherein the positioning system is configured to use the road attribute for vehicle controls if the covered distance of the vehicle equals the distance between the first point and the road attribute and, additionally, the current position of the vehicle equals the position of the projection point between the first point and the second point.

7. A vehicle with a controller, wherein the controller implements an autonomous driving system for the vehicle, the autonomous driving system comprising:
   a positioning system, configured to, by a processor, determine a current position of the vehicle between a first point along a road and a second point along the road and associated with a horizon ahead of the vehicle;
   wherein the positioning system is further configured to, by a processor:
   receive map data containing at least one road attribute;

receive multiple trajectory points which are located between the first point and the second point and determine a trajectory which interconnects the multiple trajectory points;

determine an absolute position of the vehicle;

determine a projection point from the at least one road attribute onto the trajectory;

determine the current position of the vehicle and compare the current position of the vehicle with a position of the projection point of the road attribute between the first point and the second point, wherein the positioning system is configured to determine a covered distance of the vehicle from the first point, wherein the positioning system is configured to generate an error signal to transition the vehicle to a predetermined mode if the covered distance of the vehicle equals the distance between the first point and the road attribute and, additionally, the current position of the vehicle does not equal the position of the projection point between the first point and the second point; or generate an error signal to transition the vehicle to a predetermined mode if the covered distance of the vehicle does not equal the distance between the first point and the road attribute and, additionally, the current position of the vehicle equals the position of the projection point between the first point and the second point.

8. The vehicle of claim 7,
wherein the positioning system is configured to determine the projection point by determining a perpendicular line onto the trajectory.

9. The vehicle of claim 7,
wherein the positioning system is configured to determine a distance value of the vehicle between the first point and the second point based on the current position of the vehicle and to compare this distance value with the position of the projection point.

10. The vehicle of claim 7,
wherein the positioning system is configured to iteratively track the current position of the vehicle while the vehicle moves.

11. The vehicle of claim 7,
wherein the positioning system is configured to determine a distance between the first point and a point associated with the road attribute and to compare the covered distance of the vehicle with the distance between the first point and the road attribute.

12. The vehicle of claim 7,
wherein the positioning system is configured to use the road attribute for vehicle controls if the covered distance of the vehicle equals the distance between the first point and the road attribute and, additionally, the current position of the vehicle equals the position of the projection point between the first point and the second point.

13. A method for controlling a vehicle, the method comprising:

receiving map data including at least one road attribute;

receiving multiple trajectory points which are located between a first point along a road and a second point along the road and associated with a horizon ahead of the vehicle and determining a trajectory which interconnects the multiple trajectory points;

determining, by a processor, a projection point from the at least one road attribute onto the trajectory;

determining a current position of the vehicle and comparing, by a processor, the current position of the vehicle with a position of the projection point of the road attribute between the first point and the second point;

controlling the vehicle based on the current position; and using the road attribute for vehicle controls if the covered distance of the vehicle equals the distance between the first point and the road attribute and, additionally, the current position of the vehicle equals the position of the projection point between the first point and the second point; or generating an error signal to transition the vehicle to a predetermined mode if the covered distance of the vehicle equals the distance between the first point and the road attribute and, additionally, the current position of the vehicle does not equal the position of the projection point between the first point and the second point; or generating an error signal to transition the vehicle to a predetermined mode if the covered distance of the vehicle does not equal the distance between the first point and the road attribute and, additionally, the current position of the vehicle equals the position of the projection point between the first point and the second point.

14. The method of claim 13,
wherein the projection point is determined by determining a perpendicular line onto the trajectory.

15. The method of claim 13,
further comprising the steps of:
determining a covered distance of the vehicle from the first point;
determining a distance between the first point and the road attribute and comparing the covered distance of the vehicle with the distance between the first point and the road attribute.

* * * * *